3,338,727
PIGMENTED BALL POINT PEN INK
Forrest E. Beck, Rockton, Ill., assignor to The Parker Pen Company, Janesville, Wis., a corporation of Wisconsin
No Drawing. Filed Dec. 23, 1963, Ser. No. 332,878
5 Claims. (Cl. 106—27)

The present invention relates to an ink adapted for use in ball point pens and more particularly to such an ink of the pigmented type.

Pigmented inks are inks in which a solid insoluble pigment, either organic or inorganic in character, is dispersed in a liquid or semisolid vehicle. Pigmented inks offer obvious advantages such as their permanence and the fact that they will not bleed even when applied to highly porous substrates. These inks have found wide acceptance as printing inks, but attempts to adapt them for use as ball point pen inks have met with slight or indifferent success because of the requirement that such inks be capable of storage for long periods of time in the reservoir of the pen and throughout this period be capable of instant starting, passage of the pigment particles through the small paths available in the pen tip and rapid drying after application. Also, throughout their period of use, they must be free of corrosive action on the metal parts of the pen with which they come into contact and must be of such a nature that agitation is not required to prevent the pigment particles from settling out.

Accordingly, it is an object of the present invention to provide a pigmented ball point pen ink which will produce a sharply defined permanent line.

Another object of the invention is to provide a ball point pen ink which will start writing instantly and will flow evenly and smoothly until the supply is exhausted.

A further object of the invention is to provide a ball point pen ink which will have the same shade and intensity of color throughout its period of use.

A still further object of the invention is to provide a ball point pen ink which will dry quickly through absorption of the vehicle by the paper to which it is applied.

Yet a further object of the invention is to provide a pigmented ball point pen ink of improved stability against settling out of the pigment particles.

Other and further objects of the invention will be apparent from the following detailed description.

Essentially, the present ink is a uniform dispersion of an insoluble very finely divided pigment in a liquid ester of abietic acid or dihydroabietic acid whose viscosity is such that when combined with the pigment, the viscosity of the resulting ink is no greater than 60,000 cps. which, as is the case with all viscosity values to be mentioned later, is measured at 25° C. using a Brookfield LVF Viscosimeter with spindle No. 4 at 12 r.p.m. These esters are substantially nonvolatile and constitute an excellent vehicle for the pigment in that they are effective wetting agents not only with respect to pigment particles but also with respect to the materials of the reservoir and tip of the ball point and with respect to paper.

Abietic acid is the principal ingredient of rosin, an abundant and inexpensive article of commerce, and in practice there is little reason to separate abietic acid from the other rosin acids which are present in minor proportions. Accordingly, the esters used in the vehicle of the present inks are readily prepared by esterifying rosin or its hydrogenated derivative. The methyl esters of abietic acid and dihydroabietic acid are commercially available and both provide excellent materials for preparing the vehicles of the inks of the present invention. One such product which is particularly suitable is that manufactured by the Hercules Powder Company and identified by the trademark Hercolyn. The commercial product Hercolyn contains 92–94% of methyl dihydroabietate.

A commercially available methyl ester of abietic acid is the product known by the trademark Abalyn, also manufactured by the Hercules Powder Company. Abalyn is a mixture of methyl esters of rosin acids and contains 92–94% of methyl abietate.

Another suitable commercial product, also manufactured by Hercules Powder Company is one known by the trade name Staybellite Ester 3. This material is a diester of triethylene glycol and hydrogenated rosin.

Such commercial products are to be preferred for economic reasons, but as pointed out above, it is to be understood that any liquid ester of a rosin acid may be employed provided that it can be formulated with a suitable pigment to produce an ink having a viscosity which does not exceed 60,000 cps., it being understood that the term "rosin acid" includes the dihydro or hydrogenated derivative.

As is apparent from what has gone before, the ester can be one of the rosin acids with a monohydric or a dihydric alcohol. It is to be emphasized, however, that the ester must be one which is a liquid at ambient temperature. Attempts have been made to formulate ball point pen inks employing a solid rosin ester, such as the glyceryl ester of rosin known as ester gum, dissolved in a more or less volatile liquid to produce a vehicle of the desired viscosity. Inks having such a vehicle have proved unsatisfactory because of the clogging of the pen point due to loss of solvent which causes a deposition of the solid rosin ester.

The nature of the pigment employed in the formulation of the present ink is not at all critical and it may be either organic or inorganic or, in fact, a mixture of pigments, one of which may be an organic pigment and the other an inorganic pigment. It is only necessary that the pigment be of suitable intensity and permanence, be a solid insoluble in the liquid vehicle and be in such a fine state of subdivision that it will easily pass through the minute paths available at the tip of a ball point pen.

The required state of subdivision is best assured by employing what is known as a flushed pigment. Such a pigment is an oil or varnish dispersion prepared by conventional procedures directly from an aqueous paste of the pigment by the preferential wetting of the pigment particles by an oil or varnish vehicle with the consequent separation or flushing out of the water previously contained in the pigment paste or pulp. It is often convenient to employ a pigment flushed with the ester which is to comprise the vehicle of the ink, but any flushing vehicle may be used which is compatible with the ester. If more than one pigment is to be used in the formulation of the ink, they may be flushed either in combination in a single vehicle or singly in the same or different flushing vehicles.

The class of colorants known as triphenylmethanes are examples of suitable pigments of the organic type and a particularly suitable triphenylmethane pigment is that known as Alkali Blue, International Colour Index No. 42,765. A particularly suitable pigment of the inorganic type is Iron Blue, a complex ferric ferrocyanide,

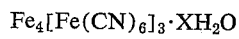

$$Fe_4[Fe(CN)_6]_3 \cdot XH_2O$$

International Colour Index No. 77,510. In fact, it has been found that a mixture of Alkali Blue and Iron Blue provides a ball point pen ink having excellent properties both as to permanence and intensity of color.

As stated earlier, the pigment and rosin ester vehicle are the essential ingredients of the present ball point pen inks and in certain instances, they may comprise the whole of the formulation. However, in spite of the fact that the rosin acid esters, themselves, have good pigment-wetting characteristics, it is preferred that there be present in the formulation a surface active agent to further stabilize the dispersion of pigment in the vehicle. The preferred stabilizer belongs to the well known class of surface active agents which are alkyl aryl sulfonates. In particular, divalent metal salts, such as the alkaline earth metal salts of alkyl aryl sulfonic acids have been found most suitable for use as stabilizers. A particularly preferred stabilizing agent is a barium salt of an alkyl aryl sulfonic acid, and such a material is commercially available. One such product is that known as Paranox 56 manufactured by the Humble Oil Company and another is that known as Bryton Hybase manufactured by the Bryton Chemical Company. This latter product contains 47% of a barium alkyl aryl sulfonate in mineral oil with sufficient barium carbonate being present to provide a 65 base number. The sulfonate portion has an average molecular weight of 1010.

Also it is often desirable to include in the ink formulation a viscosity increasing agent since many of the liquid esters suitable for use as vehicles in accordance with the present invention have a viscosity so low that an ink made by employing them would not have a viscosity within a desired range which will be mentioned hereinafter. Of the esters specifically named earlier, methyl abietate and methyl dihydroabietate require the addition of a viscosity increasing agent to produce an ink having a viscosity within the preferred range, but the diester of triethylene glycol and hydrogenated rosin is of such high viscosity that a viscosity raising agent is not required when it is used as the vehicle in the ink system.

The viscosity increasing agent, if present, may be a resin soluble in the rosin acid ester vehicle. A particularly suitable material for raising the viscosity of the ink is a hard coumarone-indene resin, such as that sold under the designation R–9 by the Neville Chemical Company. A resin of this type improves the drying characteristics of the ink in addition to performing the function of increasing the viscosity.

Before being combined with the other ingredients of the ink, the resin is preferably dissolved in a solvent to form a high viscosity varnish and for this purpose, there may be used the same rosin acid ester which comprises the vehicle of the ink.

The relative proportions of the various ingredients can be varied quite widely in the inks of the present invention, but consideration must in each instance be given to the viscosity of the resulting product. A writable viscosity ranges from about 3,000 cps. to about 60,000 cps., writing becoming somewhat fatiguing at viscosities above the higher figure. The preferred range of viscosities is from about 5,000 cps. to about 18,000 cps.

It is preferred that the amount of pigment present in the ink approach the upper limit permissible since this will obviously result in a written line of maximum intensity of color. It has been found, however, that, in general, a pigment concentration of 19% by weight of the ink is about the maximum permissible, since higher pigment concentrations tend to become thixotropic and unable to pass to and through the writing point of a ball pen. If desired, however, lower concentrations may be used, the lower limit of pigment concentration being that which produces the lowest acceptability of intensity of written line.

It was stated earlier that the rosin ester may comprise the remainder of the ink composition but that this will not usually be the case. If a stabilizer or surface active agent is present, its concentration will depend upon the particular substance used and an effective amount can readily be determined by experiment. It has been found that in the case of the preferred material, a barium alkyl aryl sulfonate, it may be added part for part with the pigment with about 12% to about 36% by weight of the final composition being a suitable range.

The viscosity increasing agent, if present, will, of course be of a concentration to produce the desired viscosity in the finally prepared ink. This can readily be determined by experimentation and will, of course, vary in accordance with the viscosity of the liquid ester vehicle as modified by the amounts of pigment and stabilizer which are present.

No special techniques are required in the formulation of the present inks. The various ingredients can be added in any order and a vigorous agitation produced by standard equipment will result in a uniform pigment dispersion which will be stable for long periods of time either inside or outside of the reservoir of the pen.

The following examples are set forth as illustrating, but not as limiting the present invention:

Example 1

An ink was prepared by vigorously stirring a mixture of the following materials in the amounts stated, finishing with a three-roll mill to improve uniformity.

| | Gms. |
|---|---|
| Pigment: | |
| (A 40% concentration of Alkali Blue, Colour Index No. 42, 765 flushed in Hercolyn) | 18.9 |
| (A 40% concentration of Iron Blue, Colour Index No. 77,510 flushed in Mineral Oil) | 28.4 |
| Stabilizer: | |
| Paranox 56 (a barium alkyl aryl sulfonate) | 21.0 |
| Vehicle: | |
| Hercolyn (methyl dihydroabietate) | 27.6 |
| High Viscosity Varnish: | |
| [43% R–9 (hard coumarone-indene resin) in Hercolyn] | 3.9 |

The ink of this example has a viscosity of 5,000 cps., and when used in a ball point pen, it is instant starting and produces a sharply defined written line of deep blue coloration.

Example 2

Example 1 was duplicated except that Abalyn (methyl abietate) was substituted for Hercolyn as the vehicle. The resulting ink had the same properties as the ink of Example 1.

The pigmented ball point pen inks of the present invention using liquid esters of rosin acids as the vehicle have the property of instant starting of the ink flow because they are not subject to autooxidation to yield solid or gummy products which would tend to clog the extremely narrow passageways through which the ink must flow at the pen tip. Moreover, the inks of the invention using such a vehicle have improved characteristics in that they dry by penetration of the paper rather than by film formation and, further, the inks have improved stability because the esters of abietic acid and dihydroabietic acid form non-thixotropic combinations with pigments, particularly in the presence of a stabilizer or fluidizer, such as the barium alkyl aryl sulfonates mentioned earlier.

While there has been described what is at present considered to be the preferred embodiment of this invention, it will be obvious to those skilled in the art that various changes and modifications may be made therein without departing from the invention, and it is, therefore, intended that the annexed claims cover all such changes and modifications as fall within the true spirit and scope of the invention.

What is claimed is:

1. A ball point pen ink composition consisting essentially of a finely divided pigment preparation, a liquid ester selected from the group consisting of methyl abietate and methyl dihydroabietate, a divalent metal salt of an alkyl aryl sulfonic acid and a resin soluble in said ester, said composition containing no more than about 19% by weight of the pigment portion of said pigment preparation, from about 12% to about 36% by weight of said metal salt and a minor amount of said resin sufficient to adjust the viscosity of said composition to a value within the range of 5,000 cps. to 18,000 cps., with the balance of said composition being substantially composed of said ester, said pigment being insoluble in and uniformly dispersed in said ester.

2. An ink as defined in claim 1 in which said metal is barium.

3. An ink as defined in claim 1 in which said resin is a coumarone-indene resin.

4. An ink as defined in claim 1 in which said pigment is a flushed pigment preparation.

5. An ink as defined in claim 12 in which said pigment preparation comprises a mixture of a triphenylmethane pigment, Colour Index No. 42,765, and a complex ferric ferrocyanide of the formula $Fe_4[Fe(CN)_6]XH_2O_3$, Colour Index No. 77,510.

References Cited
UNITED STATES PATENTS

| | | | |
|---|---|---|---|
| 2,268,595 | 1/1942 | Huber et al. | 106—29 |
| 2,644,760 | 7/1963 | Schroeder | 106—28 |
| 3,236,661 | 2/1966 | Teot | 106—23 |

FOREIGN PATENTS

| | | |
|---|---|---|
| 508,917 | 7/1939 | Great Britain. |

ALEXANDER H. BRODMERKEL, *Primary Examiner.*

SAMUEL H. BLECH, *Examiner.*

J. B. EVANS, *Assistant Examiner.*

UNITED STATES PATENT OFFICE
CERTIFICATE OF CORRECTION

Patent No. 3,338,727            August 29, 1967

Forrest E. Beck

It is hereby certified that error appears in the above numbered patent requiring correction and that the said Letters Patent should read as corrected below.

Column 5, line 12, for the claim reference numeral "12" read -- 1 --; column 6, line 1, for "$Fe_4[Fe(CN)_6]XH_2O_3$" read -- $Fe_4[Fe(CN)_6]_3 \cdot XH_2O$ --.

Signed and sealed this 1st day of October 1968.

(SEAL)
Attest:

Edward M. Fletcher, Jr.           EDWARD J. BRENNER
Attesting Officer                Commissioner of Patents